Oct. 28, 1958  J. G. GALE  2,857,644
SAFETY HOOK
Filed Dec. 16, 1954
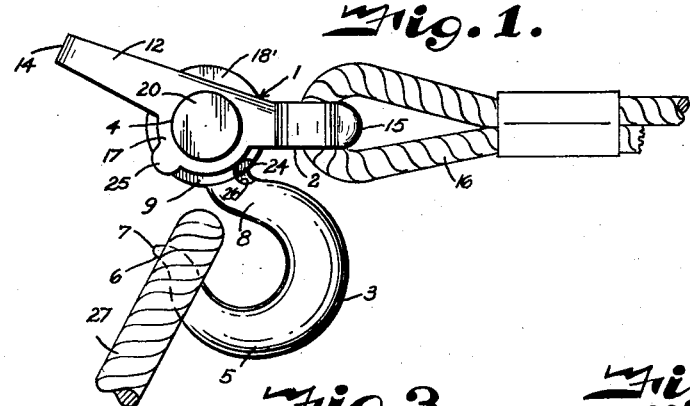
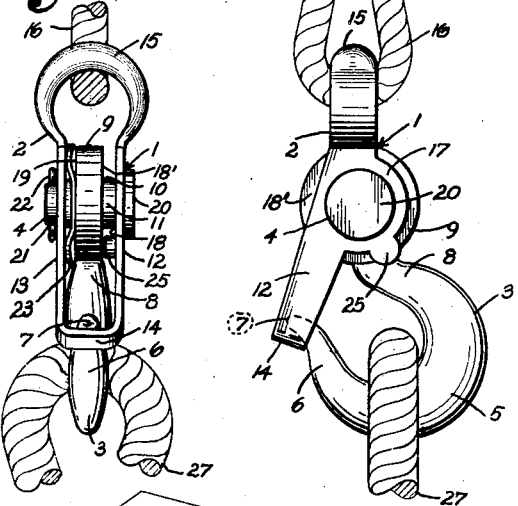
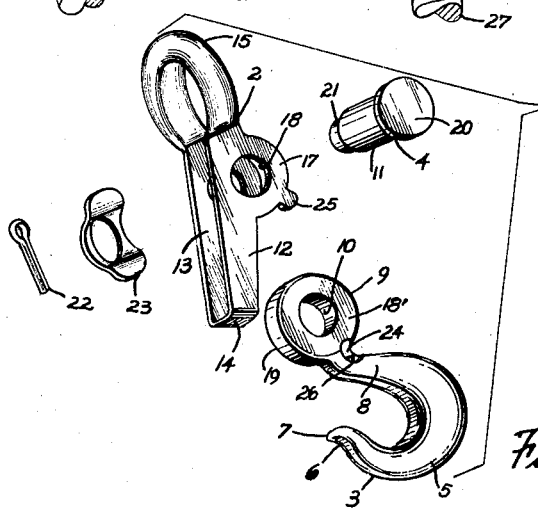
INVENTOR.
James G. Gale.
BY
Fishburn + Mullendore
ATTORNEYS.

United States Patent Office 2,857,644
Patented Oct. 28, 1958

2,857,644

SAFETY HOOK

James G. Gale, Kansas City, Mo., assignor to Newco Manufacturing Company, Inc., Kansas City, Mo., a corporation of Missouri Application December 16, 1954, Serial No. 475,621

3 Claims. (Cl. 24—242)

This invention relates to an improved safety hook for use with cable tackle in the hoisting of heavy loads.

The objects of the present invention are to provide a safety hook wherein the bight of the hook is closed to prevent detachment of the load on the hook; to provide such a structure wherein the bight closure is connected to the clevis to which the hoist line is attached and when in bight closing position, said closure is in supporting engagement with the end of the hook to aid in distribution of the load thereon; to provide such a hook and clevis with a pivoted connection and with resilient means effecting relative lateral or shifting movement of the hook and clevis and interengagement of locking members thereon; to provide such a safety hook wherein load or pull on the hook and clevis automatically closes the bight and engages the locking members on the hook and clevis to hold the bight closed during the use of the hook; and to provide a safety hook structure that is economical to manufacture and efficient, easy and positive in operation.

In accomplishing these and other objects of the present invention, I have provided approved details of structure, the preferred forms of which are illustrated in the accompanying drawings wherein:

Fig. 1 is a side elevational view of the safety hook with the parts thereof positioned whereby the bight of the hook is open for attachment of a load thereon.

Fig. 2 is an elevational view of the safety hook looking at the rear of the hook portion.

Fig. 3 is a side elevational view of the safety hook with the parts thereof in load lifting position.

Fig. 4 is a front elevational view of the safety hook in load lifting position.

Fig. 5 is a disassembled perspective view of the safety hook.

Referring more in detail to the drawings:

1 designates a safety hook structure generally consisting of a clevis 2 and a hook member 3 connected to the clevis by a pin 4. The hook member 3 is preferably formed of metal, cast or forged in a single piece, and comprises a curved body portion 5 having a forwardly and upwardly curved bill 6 terminating in an outwardly turned nose 7 at one end thereof. The other end of the curved body portion 5 has an upwardly extending shank portion 8 terminating in an eye or boss portion 9 having a bore 10 adapted to receive the shank 11 of the pin 4 which extends transversely of the hook to pivotally mount same.

The clevis 2 preferably is fabricated or formed of one piece of metal. The clevis comprises spaced parallel arms 12 and 13, the lower ends of said arms being connected by a transverse bar 14, bridging the space therebetween. The upper ends of the arms 12 and 13 are connected by a bail 15 preferably of rounded cross-sections and adapted to be engaged by a cable 16 or other piece of hoisting line or tackle to suspend the safety hook and its load. The arms 12 and 13 preferably have an enlarged portion 17 intermediate their length provided with aligned bores 18, adapted to be sleeved on the shank 11 of the pin 4. The spacing between the arms 12 and 13 is greater than the thickness between the opposite faces 18' and 19 of the boss or eye portion 9 of the hook whereby said boss is movable laterally when positioned between the arms. The distance between the transverse bar 14 and the bores 18 is such that when the shank of the pin 4 extends through the bores 18 and the bore 10 to pivotally mount the hook member on the clevis with the nose 7 of the hook toward the arms, the transverse bar 14 will engage under the nose 7 of the hook when the arms 12 and 13 are in position to close the bight of the hook.

The pin 4 has a head 20 on one end thereof adapted to engage one of the arms 12 and 13 when the shank extends through the bores 18 thereof. The other end of the pin extends beyond an opposite arm and has an aperture 21 for receiving a cotter pin 22 to hold the pin in position in the arms.

A resilient member 23 is arranged to engage the boss 9 to urge same toward the arm 12. In the illustrated structure, the resilient member consists of a spring washer which is bent whereby one portion engages the arm 13 and the other portion engages the face 19 of the boss 9 and urges said boss toward the arm 12 to effect interengagement of locking members on the arm 12 and hook member.

In the illustrated structure, the hook member is provided with a recess 24 and the arm 12 provided with a lug 25 positioned for interengagement of the lug and recess when the bar member 14 engages under the nose 7 of the hook member 3. The recess provides a shoulder 26, engagement of which with the lug 25 locks the hook to prevent same from swinging away from the arms 12 and 13 until the clevis and hook member have auxiliary force supplied thereto to effect relative lateral movement to compress the resilient member 23 and move the shoulder 26 out of engagement with the lug 25, at which time the hook may be swung relative to the clevis to open same.

In operation of the safety hook, and assuming that the parts are in the position shown in Fig. 3, wherein the nose 7 of the hook engages the transverse bar 14, and the lug 25 engages the shoulder 26, to lock the parts whereby the entrance to the hook portion of the hook is closed by the arms 12 and 13. Then in order to actuate the structure to open the hook portion, pressure is applied to the clevis and hook member to effect relative lateral movement whereby the boss 9 is moved toward the arm 13 compressing the resilient member 23 and disengaging the lug 25 from the shoulder 26, then, the parts may be swung to the position shown in Fig. 1. Suitable tackle 27 connected to a load may be applied to the hook portion and the parts of the safety hook rotated to close the opening of the hook. However, when the hook is connected to a load, if lifting force is applied to the hoisting line 16, the respective pulls on the clevis and hook portion will cause the respective members to pivot and automatically move into the position shown in Fig. 3 and the resilient member will then effect engagement of the locking members on the hook and clevis and maintain same in locked condition until force is applied to effect lateral relative movement and release of the locking members.

It is believed obvious that I have provided an economical, efficient safety hook that automatically locks when a load is applied thereto to provide a positive operation to prevent detachment of the load from the hook until released by the operator.

What I claim and desire to secure by Letters Patent is:

1. A safety hook comprising, a clevis having spaced arms, a pivot in the clevis extending between the arms, a hook having an eye portion at one end thereof with a bore therein through which the pivot extends to swingably mount the hook on the clevis, a bail on the clevis for connection with hoisting apparatus to suspend the hook and positioned relative to the arms whereby opposite pull on the bail and hook swing the arms to position closing the opening of the hook, said hook and said clevis comprising first and second members respectively, a lug on one of said members extending toward the other of said members, a recess in the other of said members terminating in a shoulder engageable by the lug when the arms are in position to close the opening of the hook, said eye portion having a transverse thickness less than the spacing between the clevis arms whereby the hook is movable axially on said pivot, and resilient means between said eye portion and one arm of said clevis engaging the hook and clevis to urge the hook axially on said pivot and laterally relative to the clevis for effecting engagement of the lug and shoulder to lock the hook and clevis against pivotal movement when the arms close the hook opening.

2. A safety hook comprising, a clevis having spaced arms with a transverse bar at the lower ends and a bail at the upper ends thereof, a pivot on the clevis and extending between the arms, a hook having an outwardly turned nose at one end and a shank portion at the other, said shank portion having a bore therein through which the pivot extends to swingably mount the hook on the clevis, said shank portion being movable axially on said pivot and laterally relative to the clevis, said bail on the clevis being for connection with hoisting apparatus to suspend the hook and positioned relative to the arms whereby opposite pull on the bail and hook swing the arms to position closing the opening of the hook, a lug on one of the clevis arms and extending laterally therefrom toward the hook, a recess on the hook and positioned to receive the lug when the transverse bar is substantially in engagement with the hook nose, said recess terminating in a shoulder at the end thereof toward the bar, and resilient means on the pivot and engaging the shank portion and clevis to urge the shank portion axially on said pivot and laterally relative to the clevis for effecting engagement of the lug and shoulder to lock the hook and clevis against pivotal movement when the transverse bar substantially engages the hook nose.

3. A safety hook comprising, a clevis having spaced arms with a transverse bar at the lower ends and a bail at the upper ends thereof, a pivot in the clevis and extending between the arms, a hook having an outwardly turned nose at one end and a shank portion at the other, said shank portion having a bore therein through which the pivot extends to swingably mount the hook on the clevis for movement in an arc substantially perpendicular to said pivot, said shank portion having a transverse thickness less than the spacing between the clevis arms whereby the hook is movable axially on said pivot, said bail on the clevis being for connection with hoisting apparatus to suspend the hook and positioned relative to the arms whereby opposite pull on the bail and hook swing the arms to a position closing the opening of the hook, said hook shank portion having a recess on one side thereof terminating in the direction of the movement of the hook to closed position and a shoulder, a lug on the clevis arm adjacent the side of the shank portion having the recess and adapted to engage the side of the shank portion when the hook is in open position and engage the shoulder when the hook is in closed position with the transverse bar in engagement with the hook nose, and resilient means on the pivot between said hook and the other arm of said clevis and engaging the hook and clevis to urge the hook axially on said pivot and laterally relative to the clevis for effecting engagement of the lug and shoulder to lock the hook and clevis against pivotal movement when the hook opening is closed by the clevis arms said hook being axially movable to an extent greater than the extent of the depth of said recess.

References Cited in the file of this patent

UNITED STATES PATENTS

| | | |
|---|---|---|
| 682,684 | Hakemeyer | Sept. 17, 1901 |
| 1,411,857 | Maiden | Apr. 4, 1922 |
| 1,842,593 | Edwards | Jan. 26, 1932 |
| 1,856,786 | Bemis | May 1, 1934 |
| 2,166,857 | Rolan | July 18, 1939 |
| 2,256,164 | Mahoney | Sept. 16, 1941 |
| 2,561,017 | Garrison | July 17, 1951 |
| 2,580,733 | Cowden | Jan. 1, 1952 |

FOREIGN PATENTS

| | | |
|---|---|---|
| 12,276 | Great Britain | 1908 |